March 24, 1936.  J. SHARP  2,034,884
HYGROMETER
Filed Nov. 23, 1931    2 Sheets-Sheet 1
FIG. I
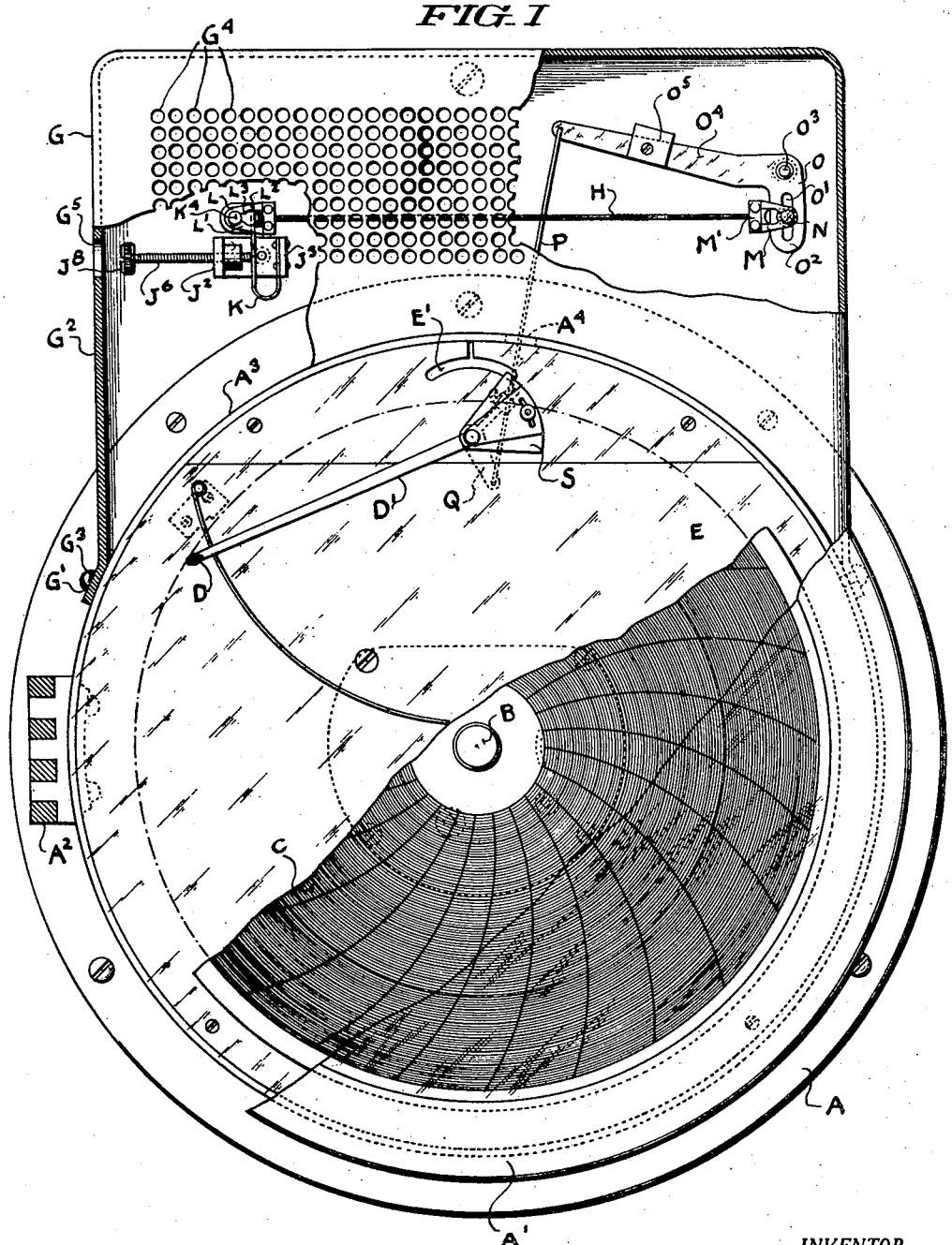
INVENTOR.
Jonathan Sharp,
BY John E. Hubbell
ATTORNEY

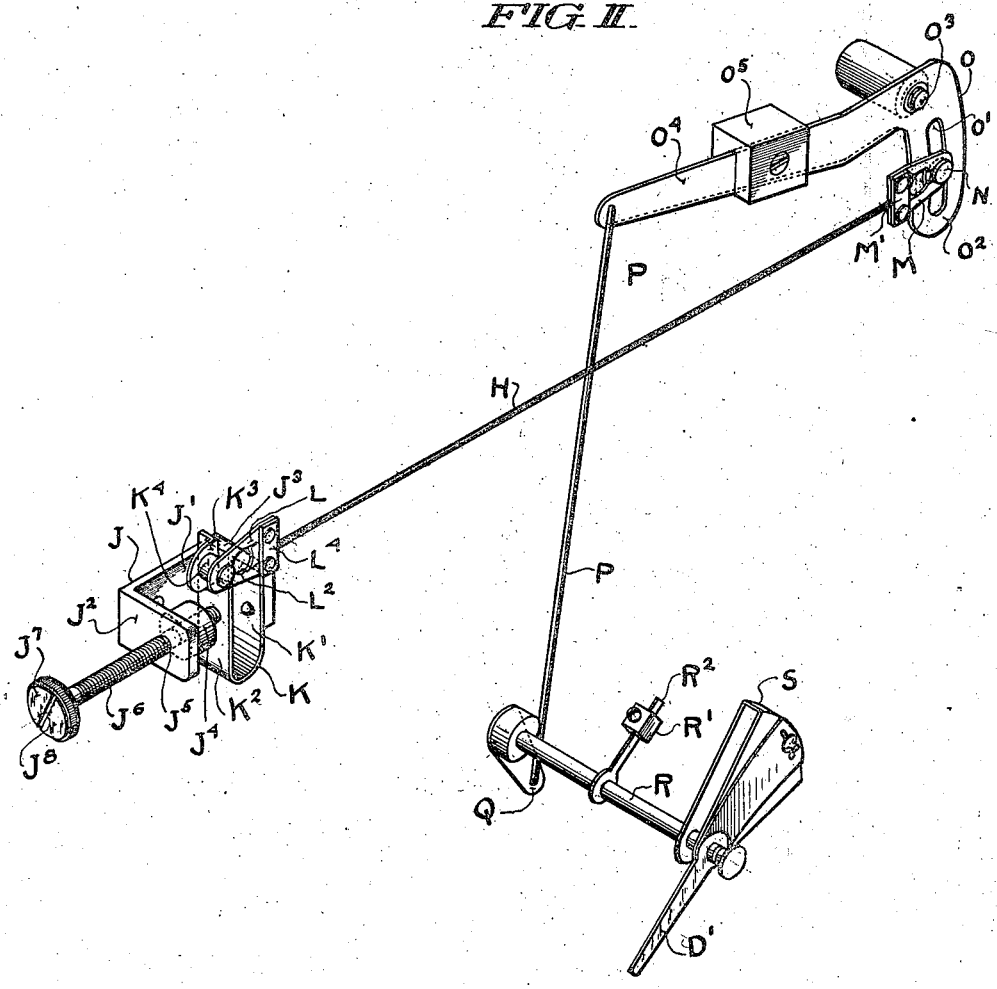

Patented Mar. 24, 1936

2,034,884

UNITED STATES PATENT OFFICE 2,034,884

HYGROMETER

Jonathan Sharp, Philadelphia, Pa., assignor to The Brown Instrument Company, Philadelphia, Pa., a corporation of Pennsylvania Application November 28, 1931, Serial No. 577,796

12 Claims. (Cl. 73—24)

My present invention relates to instruments for measuring and exhibiting the degree of moisture in a humid space in which a hygroscopic element of the instrument is exposed.

The general object of my invention is the provision of a hygrometer which is characterized by the simplicity and effectiveness of its operating mechanism, few moving parts, and relatively low cost of manufacture. A further and more specific object is the provision of a hygrometer having simple and effective provisions for adjustably supporting the hygroscopic element and through which the instrument can be easily calibrated for use and compensated when necessary for permanent changes in the hygroscopic material. Another object is the provision of a hair type hygrometer with safety provisions for preventing stretching or breakage of the strands of material forming the hygroscopic element due to the manual displacement of other parts of the instrument mechanism connected thereto. Another object is the provision of a hygrometer having simple and effective means through which the sensitivity of the instrument may be varied. Another object is the provision of a hygrometer having operating mechanism permitting the use of an exhibiting surface in conjunction therewith graduated in divisions of equal size for equal increments of humidity.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Of the drawings:

Fig. 1 is an elevation with parts broken away and in section of a recording hygrometer constructed in accordance with my invention; and Fig. 2 is a perspective of the operating mechanism shown in Fig. 1.

In the drawings I have illustrated the invention as embodied in a recording hygrometer, which, as shown, comprises a circular box-like casing A closed at its front by a glass door A' hinged at A². In the casing is enclosed mechanism for making a continuous record of the instantaneous values of the relative humidity of the atmosphere of the space in which the hygroscopic element of the instrument is exposed. The recording mechanism comprises a shaft B, on the outer end of which is removably mounted an exhibiting surface in the form of a record disc C. The shaft B is driven by any suitable constant speed mechanism, such as a spring clockwork or constant speed electric motor, which moves successive surface portions of the record disc past a marking device D of the fountain pen type carried by a pivoted pen arm D'. A plate E at the inner side of the record disc provides a smooth surface against which the record disc is lightly pressed.

The instrument casing is provided with an auxiliary housing G, the lower wall edges of which are cut away to conform with the curved peripheral wall $A^3$ of the casing A, to which marginal flanges G' on the end walls $G^2$ of the housing are secured by screws $G^3$. The casing A and housing G are thus separated by the upper section of the casing peripheral wall $A^3$. The housing G may be of various shapes, and in the construction shown, is substantially rectangular in cross-section, and included between the planes of the front and rear walls of the casing. One or more walls of the housing are advantageously formed with a multiplicity of openings $G^4$ to provide uniformity in atmospheric conditions between the surrounding space and the interior of the housing. It will be readily understood that the instrument used need not be located directly in the space, the humidity of which is to be measured, but can be located at any other point and gaseous samples withdrawn from the space and circulated through the housing G, which in that type of installation will be otherwise closed. In both types of construction the housing G serves primarily as a support and protection for the humidity measuring mechanism which will now be described.

The mechanism for measuring the humidity of the housing atmosphere comprises a hygroscopic element H which expands and contracts as the humidity of the atmosphere to which it is exposed increases and decreases, respectively. In the hygrometer shown, the humidity responsive element is preferably formed by a series of parallel strands of hygroscopic material, such as human hair, vegetable or other fibre, gut, or analogous material, closely spaced together and secured at their ends to supporting members carried by the housing G.

The hygroscopic element supporting members include a U-shaped bracket J, having its intermediate section J' secured to the rear wall of the housing, said bracket having forwardly projecting arms $J^2$ and $J^3$. A U-shaped tension spring K is positioned between the bracket arms with the inner leg K' of the spring rigidly connected to the bracket arm J³. The spring outer leg K² projects above the inner leg K' and bracket arm J³ and has an outwardly projecting lug K³ carrying a forwardly extending stud K⁴. An intermediate portion of the stud is reduced in a cross-section to receive a clamping plate L, in which an elongated curvilinear opening L' is formed. The inner portion L² of the opening is of sufficient diameter to fit over the forward end of the stud K⁴ and the outer portion L³ which forms a continuation thereof is proportioned to fit snugly around the reduced section of the stud. In assembling the parts the spring K is compressed until the stud can pass through the section L² of the plate opening with the reduced section of the stud in alignment with the plate, so that when the spring is released the plate will be movably mounted on the stud. The inner end of the clamping plate has a second plate L⁴ detachably connected thereto and the adjacent ends of the strands of material forming the hygroscopic element are secured therebetween.

The bracket arm J² is formed at its inner side with a boss J⁴, which with the corresponding portion of the bracket arm proper is formed with a threaded passage J⁵. An adjusting screw J⁶, provided with any suitable form of operating means, such as a kerf J⁸ in the screw head J⁷, extends through the boss. The adjacent wall of the housing G has an opening G⁵ in alignment therewith, permitting the insertion of a screw driver or other suitable tool for actuating the screw J⁶. The inner end of the screw abuts the outer side of the spring leg K² and may be adjusted to set the position of the stud K⁴.

The opposite end of the hygroscopic element is supported between clamping plates M and M' similar in construction to the previously described plates L and L⁴, respectively. The plates are supported by a shouldered screw N, adjustably mounted in a slot O' formed in the lower leg O² of a bell crank lever O, which is pivotally supported at O³ on the housing G. The slot O' is advantageously concentric with the axis of the stud K⁴ for a purpose hereinafter described. The outer leg O⁴ of the lever O extends inwardly at a predetermined angle to the leg O² and adjustably supports thereon a weight O⁵, by which a predetermined loading force is applied to the hygroscopic element. As the latter expands and contracts due to changes in the moisture content of the surrounding atmosphere, the lever O will be moved about its pivot O³.

The movements of the bell-crank lever O are transmitted to the exhibiting mechanism of the instrument by means of a link P, the opposite end of which is connected to the end of an arm Q secured to the rear end of an oscillatable shaft R of the exhibiting mechanism. An opening A⁴ in the casing peripheral wall A³ is provided for the passage and movements of the link P. At the forward end of the shaft R is arranged a yoke member S, which extends through an arcuate slot E' in the upper part of the plate E. The pen arm D' is adjustably connected to the front branch of the yoke and in operation deflects about the axis of the shaft R on changes in the length of the hygroscopic element. A second arm R² is carried by the shaft R and adjustably supports a weight R', which is arranged to counterbalance the other parts carried by the shaft.

Hygroscopic materials of the character described do not expand or contract uniformly with equal changes in relative humidity. The expansion of hair in particular for a certain change in humidity in the lower portion of the range will be somewhat greater than for a corresponding change in the upper portion of the range. For this reason, the exhibiting surface used is ordinarily graduated in divisions of unequal length for successive equal increments of relative humidity. In the present construction, however, the mechanical elements operatively connecting the hygroscopic element and pen arm are so proportioned and arranged that the uneven expansion and contraction movements of the element effect uniform movements of the pen arm, thereby permitting the use of a record disc graduated in divisions of equal length for equal increments of relative humidity. For example, I have found that with human hair as the hygroscopic element this result will be attained when the lever arm O² is approximately 1" in length, the arm O⁴ 4" in length and at an angle of approximately 100° with the arm O², the link P 5" in length and making an angle of approximately 68° with the arm Q when the pen arm is in its zero position, and the axis of the shaft R spaced approximately 3 1/8" horizontally and 4 5/16" vertically from the pivot O³. The foregoing measurements are given by way of example, and it will be apparent to those skilled in this art that the connecting parts may be differently proportioned to secure this desirable effect.

The spring K is so chosen that for any position in which it is set by the screw J⁶, it is always under a compression force somewhat greater than the loading force on the hydroscopic element. Whenever the pen arm or any other part is moved manually in a direction which would tend to increase the tension on the hygroscopic element, and possibly stretch or break the strands, the spring K will yield sufficiently to avoid distortion of the element. The adjustable spring support is also advantageous as it permits the instrument to be easily recalibrated for permanent changes in the length of the element which tend to occur when the element has been in use for a considerable period.

The calibration of the instrument for a given range of movement of the pen arm can be easily and effectively attained through the adjustment of the screw N in the arcuate slot O'. In calibrating the instrument, the instrument is exposed to some known humidity condition as a reference point, such as 30% relative humidity, and the screw J⁶ adjusted until the pen arm is in its proper position relative to the record disc. The instrument is then exposed to a second humidity condition, such as 70% relative humidity, and the screw N adjusted in the slot O' to bring the pen arm in a corresponding position. The arrangement of the slot O' concentric with the point of anchorage of the opposite end of the element when the instrument is at 30% relative humidity permits the sensitivity of the instrument to be adjusted without affecting the reference position of the pen arm. The sensitivity of the instrument will increase inversely in proportion to the distance of the screw N from the pivot point O³.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention what I claim as new and desire to secure by Letters Patent, is:

1. A hygrometer comprising an elongated element formed of parallel strands of hygroscopic material and adapted to expand and contract unevenly with equal changes in humidity of a humid space in which said element is exposed, a relatively fixed support connected to one end of said element, a bell crank having one leg connected to the other end of said element and arranged for pivotal movements in accordance with the expansion and contraction of said element, means providing an exhibiting surface graduated in equal divisions for equal changes in humidity values, a deflectable member adapted to move across said surface, and parts operatively connecting the other leg of said bell crank to said deflectable member comprising a shaft on which said deflectable member is secured, an arm carried by said shaft, and a link connecting said bell crank and arm, said parts being relatively proportioned and arranged to effect equal movements of said deflectable member with equal changes in humidity values.

2. A hygrometer having an elongated hygroscopic element adapted to expand and contract with changes in humidity, a spring to which one end of said element is attached, a movable support to which the other end of said element is attached, means for adjusting said spring to thereby adjust said one end lengthwise of the element, and means operatively connected to said movable support for exhibiting the movements of said element.

3. A hygrometer comprising an elongated hygroscopic element adapted to expand and contract with changes in humidity of a humid space in which said element is exposed, and means for supporting the ends of said element comprising a spring support secured to one end of said element and arranged to yield when the tension on said element slightly exceeds a predetermined value and means secured to the other end of the element and arranged to normally subject the latter to a tension of said predetermined value, cooperating means actuated by and exhibiting the expansion and contraction of said element.

4. A hygrometer comprising an elongated hygroscopic element adapted to expand and contract with changes in humidity of a humid space in which said element is exposed, and means for supporting said element and exhibiting its contraction and elongation, comprising a fixed support, exhibiting means including a movable part, and a spring, said spring and element being connected in series with one another between said support and part and forming a tension connection therebetween, the length of which is varied by the elongation and contraction of said element, said part being biased for movement in the direction opposite to that in which it is moved by the contraction of said element to maintain said connection under a normal tension, and said spring being too stiff to yield and thereby change the effective length of said connection under said normal tension, but being adapted to yield when the tension of said connection exceeds said normal tension.

5. A hygrometer comprising an elongated hygroscopic element adapted to expand and contract with changes in humidity of a humid space in which said element is exposed, means for supporting the ends of said element, and means for adjusting the point of support of one end of said element concentrically about the point of support of the opposite end of said element.

6. A hygrometer comprising an element formed of parallel strands of hygroscopic material and adapted to expand and contract with changes in humidity of a humid space in which said element is exposed, a spring support connected to one end of said element and arranged to yield when the tension on said element exceeds a predetermined value, a support for the other end of said element arranged to move in accordance with the expansion and contraction of said element, means providing an exhibiting surface graduated in humidity values, a deflectable member adapted to move across said surface, and means operatively connecting said movable support to said deflectable member.

7. A hygrometer comprising an elongated hygroscopic element adapted to expand and contract with changes in humidity of a humid space in which said element is exposed, a relatively fixed support for one end of said element, a lever support for the other end of said element, a fulcrum about which said lever is arranged to turn in accordance with the expansion and contraction of said element, means providing an exhibiting surface graduated in humidity values, a deflectable member adapted to move across said surface, means operatively connecting said lever support to said deflectable member, and means for adjusting the point of connection of said element to said movable lever support toward and away from said fulcrum to thereby vary the sensitivity of said deflectable member.

8. A hygrometer comprising an elongated hygroscopic element adapted to expand and contract with changes in humidity of a humid space in which said element is exposed, a relatively fixed support for one end of said element, a bell crank having one leg adjustably connected to the other end of said element and arranged to move in accordance with the expansion and contraction of said element, means providing an exhibiting surface graduated in humidity values, a deflectable member adapted to move across said surface, means operatively connecting the other leg of said bell crank to said deflectable member, and means for adjusting the point of connection of said element to said bell crank to vary the sensitivity of said deflectable member.

9. A hygrometer comprising an elongated hygroscopic element adapted to expand and contract with changes in humidity of a humid space in which said element is exposed, a spring support connected to one end of said element and adapted to yield when the tension on said element exceeds a predetermined value, a support for the other end of said element arranged to move in accordance with the expansion and contraction of said element, means providing an exhibiting surface graduated in humidity values, a deflectable member adapted to move across said surface, means operatively connecting said movable support and said deflectable member, and means for varying the effect of said supporting spring.

10. A hygrometer comprising an elongated hygroscopic element adapted to expand and contract with changes in humidity of a humid space in which said element is exposed, a relatively fixed support for one end of said element, a support for the other end of said element arranged to move in accordance with the expansion and contraction of said element, means providing an exhibiting surface graduated in humidity values, a deflectable member adapted to move across said surface, means operatively connecting said movable support to said deflectable member, and means for adjusting the point of connection of said element to said movable support concentrically about the point of support of the opposite end of said element to vary the sensitivity of said deflectable member.

11. A hygrometer comprising an elongated hygroscopic element adapted to expand and contract with changes in humidity of a humid space in which said element is exposed, a relatively fixed support for one end of said element, a bell crank having one leg adjustably connected to the other end of said element and arranged to move in accordance with the expansion and contraction of said element, means providing an exhibiting surface graduated in humidity values, a deflectable member adapted to move across said surface, means operatively connecting the other leg of said bell crank to said deflectable member, and means for adjusting the point of connection of said element to said bell crank concentrically about the point of support of the opposite end of said element to vary the sensitivity of said deflectable member.

12. A hygrometer comprising an elongated hygrometric element adapted to expand and contract non-uniformly through a predetermined range of humidity of a humid space in which said element is exposed, a relatively fixed support for one end of said element, the opposite end of said element being movable, means providing an exhibiting surface graduated in equal divisions for equal increments of humidity, a deflectable member associated with said surface, and means connecting said deflectable member to the movable end of said hygrometric element and capable of changing non-uniform motion of the hygrometric element into uniform measurement of the deflectable member for equal increments of humidity, said means consisting of a series of rigid link and lever parts, the part at one end of said series being connected to said movable end and the part at the other end of said series being connected to said deflectable member, and each intermediate part of said series being separately pivoted to the two immediately adjacent parts of said series so that the angular relation of an intermediate part with the one of the adjacent parts pivoted thereto and the angular relation of said intermediate part and the second of the adjacent parts pivoted thereto will be changed dissimilarly by motion of the hygrometric element.

JONATHAN SHARP.